March 5, 1963 S. A. SCHERBATSKOY 3,080,478
EPITHERMAL NEUTRON DETECTION
Filed Oct. 3, 1957 3 Sheets-Sheet 1

INVENTOR.
Serge A Scherbatskoy

United States Patent Office 3,080,478
Patented Mar. 5, 1963

3,080,478
EPITHERMAL NEUTRON DETECTION
Serge A. Scherbatskoy, 804 Wright Bldg., Tulsa 3, Okla.
Filed Oct. 3, 1957, Ser. No. 688,038
4 Claims. (Cl. 250—71.5)

This invention is concerned with a method and apparatus for performing in a bore hole measurements of radiation resulting from nuclear reactions within the formations adjoining said bore hole, said nuclear reactions being caused by an external agent such as a source of neutrons placed adjacent to said formations in the neighborhood of a detecting instrument.

This application is a continuation-in-part of my copending application Serial No. 520,478, entitled "Apparatus for Deep-Well Logging," filed July 7, 1955, now U.S. Patent No. 2,862,106.

These measurements commonly designated as "neutron well logging" can be broadly classified into two types. In the measurements of the first type a detector of gamma radiations accompanied with a source of neutrons is lowered into a bore hole in the earth and measurements are made at various depths of gamma radiations resulting from interaction of neutrons derived from said source with the adjoining formations. These measurements when correlated with depth provided a log commonly designated as neutron-gamma ray log. In the measurement of the second type a detector of low neutrons accompanied with a source of neutrons is lowered into a bore hole and the measurements obtained when correlated with depth provided a log commonly designated as neutron-thermal neutron log.

The present invention has an object to provide a new method of well logging utilizing a source of fast neutrons for irradiating the formations and measuring the epithermal neutrons returning from the formations. The epithermal neutrons result from the interaction of the primary neutrons derived from the source with various elements of the formation.

It is apparent that a stream of fast neutrons emitted by a source and having energies between 1 m.e.v. and 10 m.e.v. penetrates into the adjoining formations and undergoes numerous collisions. As a result of such collisions the incoming neutrons gradually lose their energy. The energies of neutrons therefore occupy a wide band extending from the initial high energies of the order of several m.e.v. down to a fraction of an e.v. which represents the lower energy limit and corresponds to the heat motion of the molecules in the earth formation. These low energy neutrons that are in thermal equilibrium with the adjoining formations are designated as thermal neutrons and have an energy of about $\frac{1}{40}$ e.v. Because of their low velocity these neutrons are very easily detected by various means such as, for instance, described in the U.S. Patent 2,220,509 issued to Brons. A considerable fraction of the diffused neutrons is comprised, however, within the energies that are considered above the thermal value and are located within the epithermal and fast neutron range. The epithermal range extends from 1 e.v. to about 10,000 e.v. and the fast neutron range extends above 10,000 e.v.

In neutron-thermal neutron logging methods it has been determined experimentally that there is a strong effect from salt contamination in the bore hole fluid or in the formation. Chlorine has a high thermal neutron cross-section and absorbs thermal-neutrons very strongly. Consequently, the addition of substantial quantities of NaCl to the medium surrounding the instrument lowers substantially the response in the case of a neutron-thermal neutron log.

It has also been determined experimentally that the response of a neutron-fast neutron logging instrument increases when salt is added to the environment. This effect is due to the fact that chlorine has a low fast neutron cross section as compared to the other materials of the environment and in particular, water. Adding substantial amounts of salt to water definitely reduces the fast neutron cross section. From the above two experimental determinations it can be deduced (and confirmed experimentally) that there exists a detector response region somewhere between thermal energy and fast energy where the detector response is unaffected by salt in the environment. By experiment I have determined that this energy is in the vicinity of 2 e.v., i.e. when a neutron logging instrument is provided with a neutron detector responding preferentially to neutrons in the region of 2 e.v., the addition of salt to the liquids of the instrument environment has no effect.

For further details of specific devices embodying the principles of this invention and for a more complete understanding of the mode of application of this invention and the numerous advantages thereof, reference may be had to the accompanying drawing in which.

Figure 1:
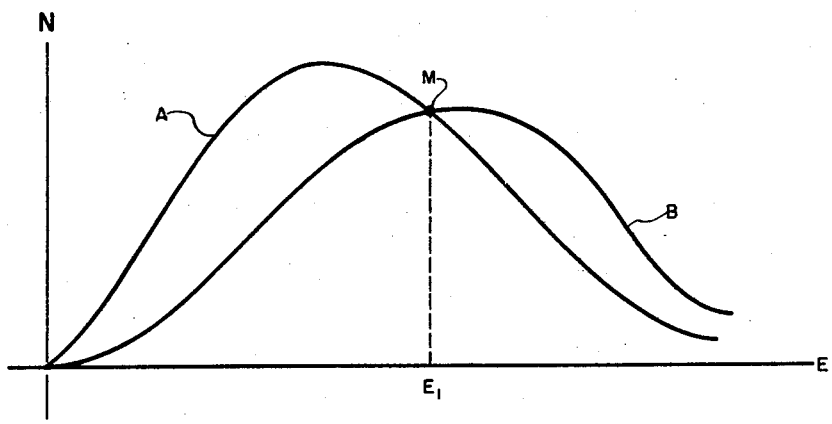
FIG. 1 shows the energy spectra of the neutron flux incident upon the detector lowered in the bore hole, the spectrum B corresponds to a porous formation containing hydrogenous liquid and salt, and in the spectrum A corresponds to a porous formation containing hydrogenous liquid and no salt.

This invention is based on the selection of a definite range of neutron energies within the epithermal portion of the spectrum of the incident neutrons, neutrons in said range being insensitive to the presence of salt in the formation fluids. In order therefore to produce a log that is indicative of the porosity of formations and independent of the salt content of said formation, I have provided a detector that is particularly responsive to the above referred to critical range of neutron energies within the epithermal spectrum corresponding to energies in the vicinity of 2 e.v.

Thus the main purpose of this detector is to provide a logging method which is unaffected by the presence of salt in the well fluid but very responsive to porosity variations of the environment.

As is well known, the neutron-thermal neutron logs are used primarily for the determination of formation porosity. In many cases the response changes of the detector caused by porosity changes in the environmont are relatively small, and in the first approximation it can be assumed that the change in detector response is approximately inversely proportional to the change in the porosity of the environment, i.e. a change in porosity of the environment of 3% or 4% will cause a corresponding change in the output of the detector of 3% or 4%. Since in many cases the difference between a well capable of producing commercial quantities of oil and a well which has to be abandoned as a "dry hole" corresponds to a difference in porosity of only a few percent, the neutron-thermal neutron logs has to have great accuracy in order to be useful, i.e. the accuracy must certainly be within a few percent.

In some cases, particularly in wells that have drilled through salt beds, the well fluid is contaminated with salt from drilling upper horizons and this salty mud is present in the well in the form of slugs or discrete portions, i.e. the mud from 3000 to 4000 feet might be very salty, but the mud from 4000 to 5000 feet might be essentially fresh water mud. When surveying the well, these zones of various salinity are traversed, and in some neutron logs cause a big effect upon the response. On a neutron-thermal neutron log, for example, the presence of these salty and fresh mud slugs can cause an effect corresponding to doubling or halving the response, i.e. approximately 100% variations.

It is thus apparent that the conventional neutron-thermal neutron logs although dependent upon the porosity of the surrounding formation, are also dependent to a very large extent upon the salinity of the fluids in these formations. Under some conditions the effect of salinity dominates the effects of porosity; thus the neutron-thermal neutron log is quite unsuitable for accurate porosity logging because any useful indication representing the variation in porosity may be masked completely by the parasitic indication representing the variation in salinity.

It is therefore the purpose of the present invention to provide a well logging method and apparatus that would be solely responsive to the porosity variations of the formation and independent of the salinity content of said formations.

In connection with my study of the above phenomena, I have discovered a very important effect. If we provide a detector responsive to thermal neutrons of energy .025 volt, then as the instrument goes from a fresh water environment to a salt water environment, the response of the detector decreases. (As was pointed out above, this is caused by the high capturing of neutrons in the chlorine of the salt.) When an instrument responsive to neutrons having energy of about 1000 volts is used, then I have found as the instrument goes from fresh water into salt water the response increases. (This is caused by the fact that the salt, when present in substantial quantities, displaces a certain amount of water and therefore hydrogen, and since it is well known that neutron logs respond inversely to hydrogen content, decreasing the hydrogen increases the response.) Using the two above observations as a starting point, I have made an investigation, since it appeared that if for low energy neutrons the response decreased with salt and for high energy neutrons the response increased with salt, there could be a region somewhere in between these energies where the effect of salt would be zero. I have found as a result of this investigation that there is such a region and that by providing a detector having a peak response at approximately 2 e.v. energy, a neutrol log can be provided that is substantially insensitive to variations in salt concentration in the drilling mud or in the environing porous formations.

The above dependence between the relative number of incident neutrons of various energies and the salinity content of the formation is illustrated in FIG. 1 in which the abscissa E represents the energy of incident neutrons and the ordinate N is such that the value $NdE$ represents the number of incident neutrons having energy values from $E$ to $E \pm dE$. The graph A represents the neutron spectrum incident upon the detector in a case when the environing fluids do not contain any salt, and the graph B corresponds to the spectrum when the environing fluids are saturated with salt. It is noted that the graphs A and B intersect at a point M and the abscissa of this point designated as $E_1$ represents the critical energy value referred to hereinabove and corresponding to about 2 e.v. It is apparent that for incident neutrons having energies below said critical value the curve B is below the curve A and therefore the presence of salt causes a decrease in the number of incident neutrons. On the other hand, for incident neutrons having energies above said critical value, the curve B is above the curve A and therefore the presence of salt causes an increase in the number of incident neutrons. On the other hand, the number of neutrons within the critical energy range represented by value $E_1$ remains invariant and independent of the presence of salt in the environing fluids.

It is the purpose of the present invention to provide a well logging system based upon the measurement of epithermal neutrons within the certain above referred to critical energy of about 2 e.v. for which the detector does not change in response for any variation in salt concentration and is responsive only to the variation in the porosity of the surrounding formations.

In achieving this novel result, I make use of the behavior of hydrogen in moderating neutrons, i.e., in slowing them down and hence reducing their energy.

It is well known that hydrogen has a very special behavior in regard to interaction with neutrons. Although the total cross section of hydrogen does not exhibit any special characteristics, the slowing down of neutrons by hydrogen is very special. Hydrogen is the element which is the most effective in slowing down neutrons, this effectiveness being due to the mass equality of the hydrogen nucleus and the neutron, providing elastic collisions with maximum loss of neutron energy. Thus if we have a source of fast neutrons of energy of the order of 5 m.e.v. immersed in a hydrogenous medium (such as in a bore hole in the earth), the spectrum of the neutrons at any point even a few inches away from the source is very different from that of the source alone.

Figure 4:
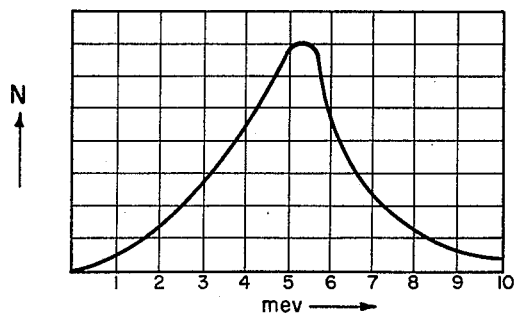
FIGS. 4 to 7 show neutron spectra and how they are influenced by various media and shields.

FIG. 4 shows the spectrum of the neutrons emitted by a radium-beryllium source (in vacuum). The axis of abscissas represents the energy of the neutrons in millions of e.v. and the axis of the ordinates shows the intensity of the neutron flux (for example, the number of neutrons per cm.$^2$ at 12″ distance).

Figure 5:
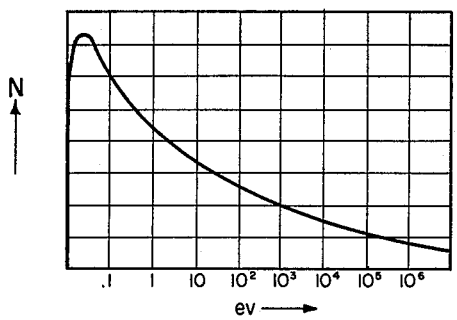

FIG. 5 shows the spectrum resulting from the source of FIG. 4 when this source is immersed in a hydrogenous medium and the neutron flux is analyzed at a 12″ distance. With reference to FIG. 5, the axis of abscissas represents the energy of the neutrons expressed in electron volts; the axis of the ordinates indicates the intensity of the neutron flux expressed in neutrons per cm.$^2$. Apart from the peak corresponding to the thermal energy of the molecules of the medium, the curve generally is descending throughout its length.

Figure 6:
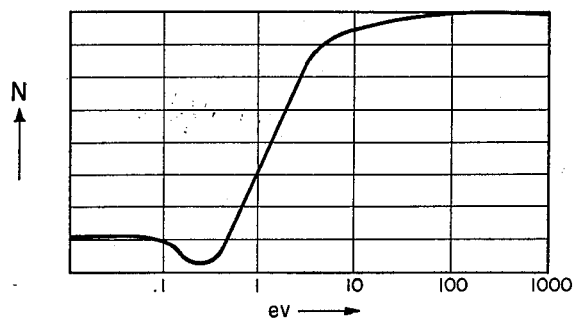

FIG. 6 shows the neutron transmission of a sheet of cadmium as a function of neutron energy. In FIG. 6 the axis of abscissas shows the energy expressed in electron volts, and, assuming a beam of heterogeneous neutrons in which all energies are equally represented, the axis of the ordinates represents the intensity of the flux on the far side of the cadmium shield expressed in neutrons per cm.$^2$.

Figure 2:
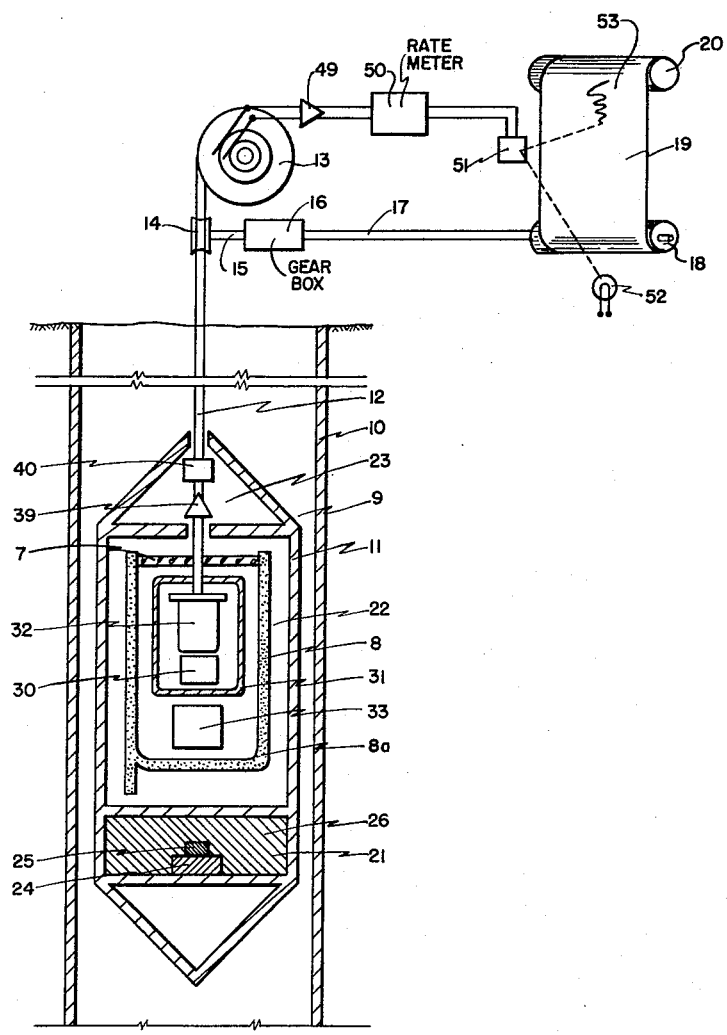
FIG. 2 illustrates diagrammatically a bore hole which penetrates the strata of the earth and the general arrangement for logging the bore hole in accordance with the principles of the present invention.
Figure 7:
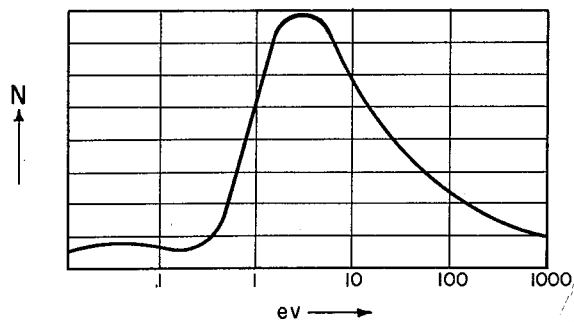

FIG. 7 shows the product of the curves of FIG. 5 and FIG. 6, i.e., the neutron flux on the far side of a sheet of cadmium that is irradiated with neutrons of heterogenous energy as represented by FIG. 5. It is seen that in FIG. 7 there is a pronounced peak in the vicinity of 2 electron volts. It is thus seen that a well-logging instrument employing a detector sensitive only to epithermal neutrons will respond principally to neutrons having energies in the vicinity of 2 e.v., if the neutrons being detected have passed through any substantial quantity of hydrogenous material. In well logging, this condition is always met, since the well fluid in which the logging instrument is immersed is always hydrogenous. In FIG. 2 I show such a well-logging instrument, wherein a detector selectively responsive to epithermal neutrons is provided.

Referring now to FIG. 2 more particularly, there is schematically illustrated a drill hole 9 penetrating the formations to be explored. The drill hole is lined in the conventional manner by a tubular metallic casing designated by 10. For the purpose of exploring the formations along the bore hole there is provided in accordance with the present invention exploratory apparatus comprising a housing 11 which is lowered into the bore hole 9 by means of a cable 12 including as a part thereof suitable insulated conductors. The cable 12 has a length somewhat in excess of the depth of the bore hole to be explored and is normally wound on a drum 13 to lower the exploring apparatus into the bore hole 9 and may be rewound upon the drum 13 to raise the exploring apparatus.

In order to determine the depth of the exploratory apparatus within the bore hole 9 at any time, there is provided a measuring wheel 14 engaging the cable 12 above the top of the bore hole and adjusted to roll on the cable in such a manner that the number of revolutions of the reel 14 corresponds to the amount of cable which has moved past the reel in either direction. The reel 14 is mounted on a shaft 15, and rotation of the reel and consequently of the shaft 15 is transmitted through a gear box 16 to another shaft 17 which is drivingly connected to take up spool 18 for moving a photographic film 19 from a feed spool 20 to the take up spool 18.

The housing 11 of the exploratory apparatus is divided into three sections designated by numerals 21 22, and 23 respectively. In the section 21 there is provided a solid support 24 on which is disposed a suitable source of neutrons generally designated as 25, such for example, as radium-beryllium preparation, which may be enclosed in a container made of a suitable material, such as glass. Instead of radium-beryllium preparation, the source of neutrons may comprise, for example, a discharge tube adapted to bombard a beryllium or lithium or tritium composition with deuterons, thus causing a generation of neutrons in a manner understood by those skilled in the art. This neutron source 25 is enclosed with a jacket 26 made of a material such as lead, which allows the neutron rays to pass for the greater part, therethrough.

The section 22 comprises an epithermal neutron detector, the same comprising a photomultiplier tube or photosensitive element 32, a phosphor 30 adjacent the photosensitive cathode (not shown) of the photomultiplier tube 32 and a shield 31 surrounding both the scintillator and the photomultiplier. The whole counter assembly is housed in a Dewar bottle 8 provided with an insulating cork 7 through which the connecting leads pass in an appropriate manner. The evacuated space between the Dewar flask walls may be filled with fine granules of carbon 8a or other suitable getter material. Inside the Dewar flask there is also positioned a suitable cartridge 33 filled with a eutectic or fusible material that melts at about 120° F. so as to prevent the interior of the flask from getting hotter than this temperature. Such a eutectic material could for example, be $(COOCH_3)_2$. The current impulses derived from the output of the photomultiplier are amplified in the amplifier 39 selected and standardized by the univibrator 40 and subsequently transmitted by means of the cable 12 to the earth's surface. These impulses are subsequently amplified in the amplifier 49 and then applied to the ratemeter 50, thus producing across the output terminals of the ratemeter a D.C. voltage having magnitude representing the rate of occurrence of these impulses. This voltage is suitably recorded in correlation with depth on a strip of photographic paper 19. This is done by means of a conventional galvanometer system including a source 52 emitting a light beam that is reflected by the mirror 51 and impinges on the strip 19. The mirror 51 is moved by means of a suitable coil connected to the output of the ratemeter 50 in such a manner that the motion of the coil causes a graph 53 to be impressed on the film 19, said graph representing the log of the formation penetrated by the bore hole.

Figure 3:
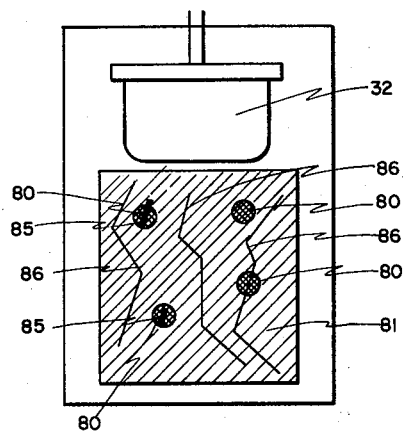
FIG. 3 shows schematically an enlarged portion of a phosphor used in FIG. 2, said enlarged portion exhibiting the neutron-sensitive grains imbedded in a transparent plastic substance.

We shall now consider more in detail the measuring system shown in FIG. 3 and comprising the phosphor 30, the photomultiplier 32, and the thermal neutron shield 31. The measurement of epithermal neutrons in the above referred to critical energy range is extremely difficult because of the presence of the intense flux of thermal neutrons and gamma rays. Thermal neutron detectors are well known and owe their high efficiency to the very high neutron cross sections of the elements used in their construction. Fast neutron detectors are also well known and are based upon the recoil of hydrogen nuclei. These detectors, however, are incapable of measuring neutrons in the presence of a gamma ray background below neutron energies of about 50 k.e.v. In other words, for a neutron energy of 50 k.e.v. and a gamma ray background in the m.e.v. region, the pulses generated by the neutrons are no larger than, and are not distinguishable from, the pulses generated by gamma rays. I have therefore designed a special neutron detector based on the scintillation principle. It consists of a phosphor designed to have good response in the epithermal neutron region, surrounded by a shield which bars thermal neutrons. I have found that a fast neutron shield is not normally necessary because the hydrogenous nature of the environment in well logging diminishes the intensity of the fast neutron flux to a negligibly low level. If necessary, a fast neutron shield can be provided, however. The special phosphor that I have designed has a structure shown in FIG. 3, and it consists of a uniform dispersion of "sensitive" grains designated by numeral 80 molded directly into a "matrix substance" designated as 81. Each of the sensitive grains 80 contains a mixture of zinc sulfide and an element having a high capture cross section for slow neutrons, "slow neutrons" usually including thermal and epithermal neutrons. Such elements may be, for instance, boron, lithium, or hafnium. It is well known that any of said neutron sensitive elements when capturing a slow neutron emits a heavy particle of a determined energy. Thus in case of boron the capture of a slow neutron is accompanied by an emission of 2.3 m.e.v., the main portion of which appears as the kinetic energy of an alpha particle; in case of lithium we have an emission of 4.63 m.e.v. which appears as kinetic energy of an alpha particle and an ion of tritium. The diameter of each sensitive grain 80 should be no greater than the mean range of a heavy particle within said grain emtited as a result of neutron capture, said range being of the order from 10–30 microns. It is apparent that the energy lost by the heavy particle within the grain causes the zinc sulfide to scintillate and thus emits a light pulse that passes through the transparent matrix 81. The matrix 81 may be of Vicor glass, plastic or a liquid or any other suitable substance that is transparent to the light impulses emitted within the sensitive grains as a result of interaction with the neutrons.

An important feature of the above arrangement is its very low sensitivity to gamma rays. This is illustrated in FIG. 3 in which the lines 85 represent the tracks of heavy particles resulting from slow neutron capture and lines 86 represent the tracks of electrons emitted as a result of interaction with photons. We should note that the rate of energy loss per cm. is considerably higher for heavy particle tracks than for electrons. Furthermore, the total energy of each heavy particle track 85 is contained within the sensitive grain, and therefore it is converted almost in its entirety into a luminous pulse that is transmitted through the transparent matrix to the photomultiplier. On the other hand, thin tracks due to electrons are almost entirely contained within the transparent matrix material, and only a small fraction of these tracks will pass through the sensitive grain. Since the matrix is not luminescent, the energy of the electron dissipated within the matrix is undetected and only that portion of said energy may be detected that is dissipated in the portion of the track that passes through the sensitive grain, since only in this portion the kinetic energy of the electron is transformed into luminous energy by the zinc sulfide. It is readily apparent that this portion is very small compared to the energy dissipated in the zinc sulfide as a result of neutron capture. Therefore, each capture of a slow neutron is accompanied by the emission from the sensitive grain of a relatively intense pulse of light to the photomultiplier 32, whereas the light pulses released by the grains as a result of photon interaction are relatively small.

It is thus apparent that I have provided a phosphor for slow neutrons that is substantially insensitive to the incident gamma rays. I find, however, that selective detection of epithermal neutrons can be achieved with other phosphors.

Thus, alternative phosphors can be made of fine dispersions of zinc sulfide in boron polyesters and of boron esters of the type $B(OC_nH_{2n+1})_c$ activated with zinc sulfide. Also, I have found that boron or lithium salts such as iodides activated with europium can produce satisfactory results as the phosphor 30.

It is sometimes desirable to include in the phosphor material substances such as hydrogen, carbon or other light elements so that neutron moderation will take place in the phosphor body.

The phosphor 30 is placed adjacent to a photomultiplier tube 32. Thus the light impulses produced within the phosphor cause corresponding electrical pulses across the output terminals of the photomultiplier.

Surrounding the photomultiplier tube 32, and the phosphor 30, is a thermal neutron shield 31. This shield is formed of a material that includes an element such as samarium, gadolinium, dysprosium, or cadmium having a high absorption cross section for thermal neutrons while having a relatively low absorption cross section for epithermal neutrons. Although boron and lithium have high absorption cross section for thermal neutrons, these elements are not as efficient for the shield 31 as their absorption cross section drops rather slowly with increasing neutron energy so as to absorb some epithermal neutrons that are thus unable to reach the phosphor 30.

In order to pass and transmit to the surface apparatus the pulses due to the neutrons and block the pulses due to the gamma rays, I have provided amplifier 39 and univibrator 40. The univibrator 40 is well known in the art. Its action is such that for all input pulses smaller than a certain critical size, the univibrator fails to trigger and therefore, does not generate any voltage kicks at its output. For pulses greater than a certain critical size, the univibrator triggers and transmits an output pulse. The output pulse is of standardized magnitude and consequently, all the pulses impressed upon the cable are of the same magnitude and represent neutrons. The smaller scintillations generated in the crystal by gamma rays generate small pulses and these are blocked by the univibrator and not transmitted over the cable.

For purposes of simplicity of illustration, I have not shown in the drawings the power supplies for the amplifiers, univibrators and photomultipliers. Power supplies are well known in the art and are assumed to be contained within the blocks representing these units.

The invention has been described in considerable detail in order to convey the full appreciation and understanding thereof, the actual scope of the invention being defined in the appended claims.

I claim:

1. A system for determining the character of formations traversed by a bore hole, comprising a sub-surface unit capable of being lowered into said bore hole, said unit comprising a source of neutrons and a detector means responsive to incident neutrons returned to said unit from the formations surrounding said bore hole, said detector means comprising a phosphor capable within this body of interacting with neutrons, the probability of such interaction decreasing as the energy of the neutrons increases, said phosphor having the property of emitting scintillations as a result of said interactions, a neutron shield surrounding said phosphor for selective transmission of neutrons, said transmission increasing as the energy of the neutrons increases, the neutron-interaction characteristic of said phosphor and the neutron-transmission characteristic of said shield cooperating to provide an over-all band-pass characteristic affording to said detector means maximum response to incident neutrons within a specific energy range, and discriminating against detection of neutrons having energies either above or below said range, said detector means also comprising a photomultiplier optically coupled to said phosphor and operative to produce electric pulses responsively to said scintillations, means surrounding said detector means operative to define a heat-insulated zone therearound, means in said zone for maintaining the temperature therein no greater than about 120° F. when said instrument is in a bore hole, a selective network within said unit fed by the electric pulses from said photomultiplier operative to transmit at least some of said pulses exceeding a predetermined magnitude and suppressing the remainder of said pulses, means for lowering said unit to various depths in said bore hole, and means for recording the repetition rate of said transmitted pulses in correlation with depth.

2. A system for determining the character of formations traversed by a bore hole, comprising a sub-surface unit capable of being lowered into said bore hole, said unit comprising a source of neutrons and a detector means responsive to incident neutrons returned to said unit from the formations surrounding said bore hole, said detector means comprising a phosphor capable within its body of interacting with neutrons, the probability of such interaction decreasing as the energy of the neutrons increases, said phosphor having the property of emitting scintillations as a result of said interactions, a neutron shield surrounding said phosphor for selective transmission of neutrons, said transmission increasing as the energy of the neutrons increases, the neutron-interaction characteristic of said phosphor and the neutron-transmission characteristic of said shield cooperating to provide an over-all band-pass characteristic affording to said detector means maximum response to incident neutrons within an epithermal energy range, and discriminating against detection of neutrons having energies either above or below said range, said detector means also comprising a photomultiplier optically coupled to said phosphor and operative to produce electric pulses responsively to said scintillations, means surrounding said detector means operative to define a heat-insulated zone therearound, means in said zone for maintaining the temperature therein no greater than about 120° F. when said instrument is in a bore hole, a selective network within said unit fed by the electric pulses from said photomultiplier operative to transmit at least some of said pulses exceeding a predetermined magnitude and suppressing the remainder of said pulses, means for lowering said unit to various depths in said bore hole, and means for recording the repetition rate of said transmitted pulses in correlation with depth.

3. A system for determining the character of formations traversed by a bore hole, comprising a sub-surface unit capable of being lowered into said bore hole, said unit comprising a source of neutrons and a detector means responsive to incident neutrons returned to said unit from the formations surrounding said bore hole, said detector means comprising a phosphor capable within its body of interacting with neutrons, the probability of such interaction decreasing as the energy of the neutrons increases, said phosphor having the property of emitting scintillations as a result of said interactions, a neutron shield surrounding said phosphor for selective transmission of neutrons, said transmission increasing as the energy of the neutrons increases, the neutron-interaction characteristic of said phosphor and the neutron-transmission characteristic of said shield cooperating to provide an over-all band-pass characteristic affording to said detector means maximum response to incident neutrons within a specific energy range, and discriminating against detection of neutrons having energies either above or below said range, said shield and said phosphor being selected to provide for said detector means a peak response to incident neutrons having energies lying between 1 e.v. and 10 e.v., said detector means also comprising a photomultiplier optically coupled to said phosphor and operative to produce electric pulses responsively to said scintillations, means surrounding said detector means operative to define a heat-insulated zone therearound, means in said zone for maintaining the temperature therein no greater than about 120° F. when said instrument is in a bore hole, a selective network within said unit fed by the electric pulses from said photomultiplier operative to transmit at least some of said pulses exceeding a predetermined magnitude and suppressing the remainder of said pulses, means for lowering said unit to various depths in said bore hole, and means for recording the repetition rate of said transmitted pulses in correlation with depth.

4. A system for determining the character of formations traversed by a bore hole, comprising a sub-surface unit capable of being lowered into said bore hole, said unit comprising a source of neutrons and a detector means responsive to incident neutrons returned to said unit from the formations surrounding said bore hole, said detector means comprising a phosphor capable within its body of interacting with neutrons, the probability of such interaction decreasing as the energy of the neutrons increases, said phosphor having the property of emitting scintillations as a result of said interactions, a neutron shield surrounding said phosphor for selective transmission of neutron, said transmission increasing as the energy of the neutrons increases, the neutron-interaction characteristic of said phosphor and the neutron-transmission characteristics of said shield cooperating to provide an over-all band-pass characteristic affording to said detector means maximum response to incident neutrons within a specific energy range, and discriminating against detection of neutrons having energies either above or below said range, said shield and said phosphor being selected to provide for said detector means a peak response to incident neutrons having energies in the neighborhood of 2 e.v., said detector means also comprising a photomultiplier optically coupled to said phosphor and operative to produce electric pulses responsively to said scintillations, means surrounding said detector means operative to define a heat-insulated zone therearound, means in said zone for maintaining the temperature therein no greater than about 120° F. when said instrument is in a bore hole, a selective network within said unit fed by the electric pulses from said photomultiplier operative to transmit at least some of said pulses exceeding a predetermined magnitude and suppressing the remainder of said pulses, means for lowering said unit to various depths in said bore hole, and means for recording the repetition rate of said transmitted pulses in correlation with depth.

References Cited in the file of this patent
UNITED STATES PATENTS

| 2,740,898 | Youmans | Apr. 3, 1956 |
| 2,769,915 | Tittle | Nov. 6, 1956 |
| 2,782,318 | Herzog | Feb. 19, 1957 |
| 2,824,233 | Herzog | Feb. 18, 1958 |
| 2,830,188 | Scherbatskoy | Apr. 8, 1958 |
| 2,830,189 | Scherbatskoy | Apr. 8, 1958 |

OTHER REFERENCES

On Plastic Scintillation Phosphors, by Kloepper et al., from Review of Scientific Instruments, vol. 23, No. 8, August 1952, pages 446, 447.

A Slow Neutron Detector, by Alburger, from The Review of Scientific Instruments, vol. 23, No. 12, December 1952, page 769.

A Fast Neutron Scintillator, by Emmerich, from The Review of Scientific Instruments, vol. 25, No. 1, January 1954, pages 69, 70.